United States Patent
Cai et al.

(10) Patent No.: US 11,514,783 B2
(45) Date of Patent: Nov. 29, 2022

(54) VEHICLE NAVIGATION UNDER CONTROL OF AN INTERACTIVE TERMINAL

(71) Applicant: TENCENT TECHNOLOGY (SHENZHEN) COMPANY LIMITED, Shenzhen (CN)

(72) Inventors: Guanming Cai, Shenzhen (CN); Shuaiwen Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 183 days.

(21) Appl. No.: 15/975,658

(22) Filed: May 9, 2018

(65) Prior Publication Data

US 2018/0261089 A1 Sep. 13, 2018

Related U.S. Application Data

(63) Continuation of application No. PCT/CN2017/074453, filed on Feb. 22, 2017.

(30) Foreign Application Priority Data

Feb. 23, 2016 (CN) .......................... 201610099053.2

(51) Int. Cl.
*G08G 1/0968* (2006.01)
*G01C 21/36* (2006.01)
(Continued)

(52) U.S. Cl.
CPC ..... *G08G 1/096827* (2013.01); *G01C 21/362* (2013.01); *G01S 5/0027* (2013.01);
(Continued)

(58) Field of Classification Search
CPC . G08G 1/0968–0969; G08G 1/096883; G08G 1/096827; G08G 1/00;
(Continued)

(56) References Cited

U.S. PATENT DOCUMENTS

| 2006/0200302 | A1 | 9/2006 | Seko |
| 2009/0018769 | A1* | 1/2009 | Poliak ................. G01C 21/362 |
| | | | 701/533 |

(Continued)

FOREIGN PATENT DOCUMENTS

| CN | 102721421 A | 10/2012 |
| CN | 103424121 A | 12/2013 |

(Continued)

OTHER PUBLICATIONS

Su et al.—English description of CN-104897166-A via Espacenet Patent Translate, Feb. 24, 2020 (Year: 2020).*

(Continued)

*Primary Examiner* — Jeffrey C Boomer
*Assistant Examiner* — Paul Allen
(74) *Attorney, Agent, or Firm* — ArentFox Schiff LLP (57) ABSTRACT

A method of an interactive server system for providing location information to an in-vehicle terminal includes receiving the location information and indication information from an interactive client, the indication information indicating address information of the in-vehicle terminal, obtaining the address information of the in-vehicle terminal based on the received indication information, sending the location information to the in-vehicle terminal according to the address information of the in-vehicle terminal, and instructing the in-vehicle terminal to generate a navigation path according to the location information.

18 Claims, 6 Drawing Sheets

(51) Int. Cl.
  *H04W 4/44* (2018.01)
  *H04W 4/021* (2018.01)
  *H04W 4/02* (2018.01)
  *H04W 8/18* (2009.01)
  *G01S 5/00* (2006.01)
  *G08G 1/0969* (2006.01)

(52) U.S. Cl.
  CPC ...... *G08G 1/096883* (2013.01); *H04W 4/021* (2013.01); *H04W 4/025* (2013.01); *H04W 4/44* (2018.02); *H04W 8/18* (2013.01); *G08G 1/0969* (2013.01)

(58) Field of Classification Search
  CPC ...... G01C 21/362; G01C 21/00; G06Q 50/01; G01S 5/0027; H04W 4/021; H04W 4/025; H04W 4/44; H04W 8/18
  USPC .................................. 701/400–541; 705/319
  See application file for complete search history.

(56) References Cited

U.S. PATENT DOCUMENTS

| | | | | |
|---|---|---|---|---|
| 2009/0112460 A1* | 4/2009 | Baker | ...................... | H04L 67/18 701/532 |
| 2009/0325607 A1* | 12/2009 | Conway | ................ | G06F 3/0485 455/456.3 |
| 2010/0081461 A1* | 4/2010 | Bothra | ..................... | H04L 51/32 455/466 |
| 2010/0168995 A1* | 7/2010 | Van Der Meer | .... | G06F 16/9537 701/532 |
| 2011/0015858 A1* | 1/2011 | Takagi | ................... | G01C 21/26 701/533 |
| 2011/0106425 A1* | 5/2011 | Trum | ................. | G01C 21/3476 701/533 |
| 2011/0161000 A1* | 6/2011 | Ross | .................... | G01C 21/362 701/533 |
| 2011/0166776 A1* | 7/2011 | Keller | .................. | G01C 21/362 701/533 |
| 2011/0258271 A1* | 10/2011 | Gaquin | ............... | H04M 1/7243 709/206 |
| 2012/0044089 A1* | 2/2012 | Yarnold | ................. | G08G 1/202 340/901 |
| 2012/0136565 A1* | 5/2012 | Kennedy | ............... | H04W 4/029 701/436 |
| 2013/0158854 A1* | 6/2013 | Weir | .................. | G01C 21/3617 701/400 |
| 2013/0282806 A1* | 10/2013 | Steinberg | .............. | H04L 67/306 709/204 |
| 2014/0129133 A1* | 5/2014 | Wang | ................... | G01C 21/362 701/409 |
| 2014/0129143 A1* | 5/2014 | Dave | ................. | G01C 21/3407 701/537 |
| 2014/0195628 A1* | 7/2014 | Church | .................. | H04W 4/80 709/206 |
| 2014/0214933 A1* | 7/2014 | Liu | ......................... | H04W 4/44 709/204 |
| 2014/0351351 A1* | 11/2014 | Yu | .......................... | H04L 51/20 709/206 |
| 2015/0025783 A1* | 1/2015 | Sechny | .................. | G01C 21/34 701/117 |
| 2015/0112990 A1* | 4/2015 | van Os | ................. | G06F 16/244 707/737 |
| 2015/0146982 A1* | 5/2015 | Tsai | ..................... | G06K 9/2081 382/177 |
| 2015/0339921 A1* | 11/2015 | Hainzlmaier | .... | G08G 1/096811 340/905 |
| 2016/0131488 A1* | 5/2016 | Zorb-Schliefer | ...... | G01C 21/26 701/454 |
| 2016/0191637 A1* | 6/2016 | Memon | ................. | H04W 4/024 701/522 |
| 2016/0273930 A1* | 9/2016 | Wada | ................. | G01C 21/3438 |
| 2016/0298975 A1* | 10/2016 | Kawasaki | .......... | G01C 21/3605 |
| 2016/0360336 A1* | 12/2016 | Gross | ................ | H04M 1/72403 |
| 2017/0068249 A1* | 3/2017 | Minowa | ............... | G05D 1/0291 |
| 2017/0122764 A1* | 5/2017 | Nakahara | ........... | G01C 21/3682 |
| 2018/0216950 A1* | 8/2018 | Seagraves | .......... | G01C 21/3484 |
| 2018/0227704 A1* | 8/2018 | Itoh | ........................ | G08G 1/005 |

FOREIGN PATENT DOCUMENTS

| | | | | |
|---|---|---|---|---|
| CN | 104034343 A | * | 9/2014 | .......... G01C 21/362 |
| CN | 104121909 A | * | 10/2014 | |
| CN | 104125282 A | | 10/2014 | |
| CN | 104180812 A | | 12/2014 | |
| CN | 104296769 A | | 1/2015 | |
| CN | 104296770 A | | 1/2015 | |
| CN | 104897166 A | | 9/2015 | |
| CN | 105606114 A | | 5/2016 | |
| EP | 1 531 442 A2 | | 5/2005 | |

OTHER PUBLICATIONS

Wang Erqi—English Translation of CN-104121909-A via Espacenet Patent Translate, retrieved Jul. 20, 2020 (Year: 2020).*
P. Wang, X. Wu and H. Yang, "Analysis of the Efficiency of Data Transmission Format Based on Ajax Applications," 2011 International Conference of Information Technology, Computer Engineering and Management Sciences, 2011, pp. 265-268, doi: 10.1109/ICM.2011.199. (Year: 2011).*
Client-server model—Wikipedia, capture from Jan. 31, 2016, via archive.org, https://web.archive.org/web/20160131065555/https://en.wikipedia.org/wiki/Client%E2%80%93server_model (Year: 2016).*
Huang L—English Description of CN-104034343-A via Espacenet Patent Translate, retrieved Apr. 25, 2022 (Year: 2022).*
International Search Report dated May 24, 2017 in PCT/CN2017/074453 with English translation.
Written Opinion with English translation dated May 24, 2017 in PCT/CN2017/074453.
International Preliminary Report on Patentability dated Aug. 28, 2018 in PCT/CN2017/074453 with concise English translation.
Chinese Office Application dated Nov. 5, 2018 in Chinese Application No. 201610099053.2 with partial English translation.
Chinese Office Application dated Feb. 11, 2019 in Chinese Application No. 201610099053.2 with partial English translation.

* cited by examiner

VEHICLE NAVIGATION UNDER CONTROL OF AN INTERACTIVE TERMINAL

RELATED APPLICATION

This application is a continuation of International Application No. PCT/CN2017/074453, filed on Feb. 22, 2017, which claims priority to Chinese Patent Application No. 201610099053.2, entitled "In-Vehicle Navigation Method, Interactive System Server, Terminal, and System" filed on Feb. 23, 2016. The entire disclosures of the prior applications are hereby incorporated by reference in their entirety.

FIELD OF THE TECHNOLOGY

The present disclosure relates to vehicle navigation.

BACKGROUND OF THE DISCLOSURE

Vehicle navigation can be performed by using a satellite based navigation device in coordination with an electronic map, and can conveniently and accurately inform a driver of the shortest or fastest path to a destination, providing a good assistance to the driver.

To use the vehicle navigation, a user usually needs to perform a series of complex operations, including entering a destination on a keyboard or a virtual keyboard, searching for the destination by means of in-vehicle retrieval, selecting, from the found destinations, the destination, and then click to initiate navigation. That is, the user needs to interact with an in-vehicle terminal multiple times to initiate navigation, causing complex operations, low efficiency of navigation initiation, and a poor user experience.

SUMMARY

Aspects of the disclosure provide a method of an interactive server system for providing location information to an in-vehicle terminal. The method can include receiving location information and indication information from an interactive client, the indication information indicating address information of the in-vehicle terminal, obtaining the address information of the in-vehicle terminal based on the received indication information, sending the location information to the in-vehicle terminal according to the address information of the in-vehicle terminal, and instructing the in-vehicle terminal to generate a navigation path according to the location information.

In one example, the indication information comprises the address information of the in-vehicle terminal. In one example, the in-vehicle terminal invokes a map navigation application to generate the navigation path according to the location information. In one example, the indication information includes a target account number, and the obtaining the address information of the in-vehicle terminal based on the received indication information includes obtaining the address information of the in-vehicle terminal based on the received indication information and association information between the target account number and the address information of the in-vehicle terminal stored in a memory of the interactive server system.

In one example, the indication information indicates an interactive group associated with one or more target account numbers, and the interactive server system stores association information between the one or more target account numbers and address information of one or more in-vehicle terminals, the one or more in-vehicle terminals including the in-vehicle terminal. The obtaining the address information of the in-vehicle terminal includes obtaining the address information of the one or more in-vehicle terminals associated with the one or more target account numbers in the interactive group based on the indication information and the association information stored in a memory of the interactive server system. The location information is sent to the one or more in-vehicle terminals corresponding to the address information associated with the one or more target account numbers that are associated with the interactive group. In various examples, the location information can include at least one of a point of interest, geographical location information, or path trajectory information.

Aspects of the disclosure provide a non-transitory computer-readable medium that stores instructions. The instructions, when executed by a computer, cause the computer to perform a method of providing location information to an in-vehicle terminal. The method can include receiving an instruction to send location information and indication information to an interactive server system, and sending the location information and the indication information to the interactive server system in response to receiving the instruction. The indication information can indicate address information of the in-vehicle terminal. The interactive server system can obtain the address information of the in-vehicle terminal based on the indication information, send the location information to the in-vehicle terminal according to the obtained address information, and instruct the in-vehicle terminal corresponding to the obtained address information to generate a navigation path according to the location information.

In one example, the indication information includes the address information of the in-vehicle terminal. In one example, the indication information includes a target account number associated with the address information of the in-vehicle terminal. In one example, the indication information indicates an interactive group that is associated with one or more target account numbers, and the one or more target account numbers are associated with address information of one or more in-vehicle terminals, the one or more in-vehicle terminals including the in-vehicle terminal. The interactive server system can obtain the address information of the one or more in-vehicle terminals based on the indication information, send the location information to the one or more in-vehicle terminals according to the obtained address information, and instruct each of the one or more in-vehicle terminals corresponding to the obtained address information to generate a navigation path according to the location information.

Embodiments of the method performed by the computer can further include receiving second location information and second indication information from another application executed on the computer that receives an instruction to send the second location information and the second indication information to the interactive server system, providing a transmit interface, and sending, to the interactive server system, the second location information and the second indication information received from the other application using the transmit interface.

Aspects of the disclosure further provide an interactive server system. The server includes processing circuitry configured to receive location information and indication information from an interactive client, the indication information indicating address information of the in-vehicle terminal, obtain the address information of the in-vehicle terminal based on the received indication information, send the location information to the in-vehicle terminal according to the address information of the in-vehicle terminal, and instruct the in-vehicle terminal to generate a navigation path according to the location information.

BRIEF DESCRIPTION OF THE DRAWINGS

To describe the technical solutions in the embodiments of the present disclosure or in the related technology more clearly, the following briefly describes the accompanying drawings required for describing the embodiments or the related technology. The accompanying drawings in the following description show merely some embodiments of the present disclosure, and a person of ordinary skill in the art may still derive other drawings from these accompanying drawings.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. Other embodiments obtained by a person of ordinary skill in the art based on the embodiments in the present disclosure shall fall within the claimed scope of the present disclosure.

Figure 1:
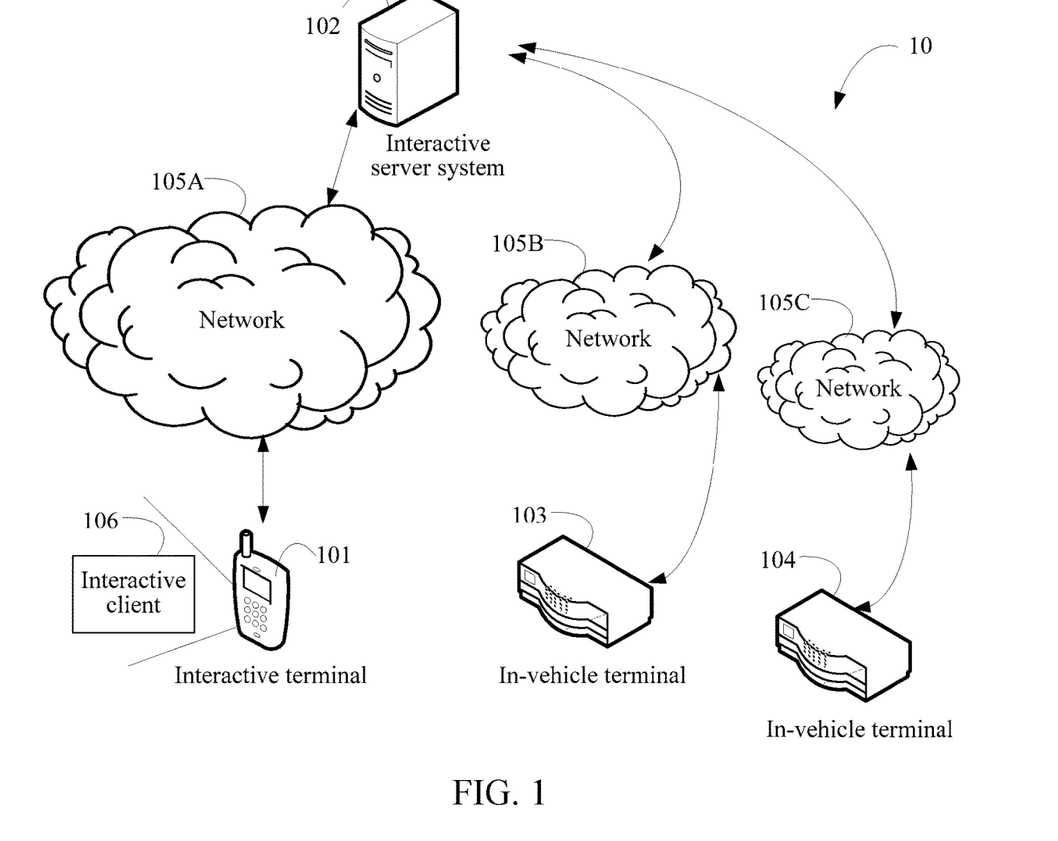
FIG. 1 shows a schematic network architectural diagram of a vehicle navigation system according to an embodiment of the present disclosure.

FIG. 1 shows a schematic network architectural diagram of a vehicle navigation system 10 according to an embodiment of the present disclosure. As shown in FIG. 1, the navigation system 10 may include an interactive server system 102, an interactive terminal 101, a first in-vehicle terminal 103, and a second in-vehicle terminal 104. The interactive server system 102 may be in communication connection with the interactive terminal 101 and the in-vehicle terminals 103-104 by using a network 105a, 105b, or 105c, and the interactive terminal 101 may be in communication connection with the in-vehicle terminals 103-104 in a wired or wireless manner.

The interactive terminal 101 may include an interactive client 106. The interactive terminal 101 may send location information to the interactive server system 102 using the interactive client 106 based on an interactive system or platform provided by the interactive server system 102. The interactive server system 102 sends the location information to the in-vehicle terminal 103 or 104. Then after receiving the location information, the in-vehicle terminal 103 or 104 may plan a navigation path according to the location information, thereby completing a navigation initiation.

It is noted that location information in the embodiments of the present disclosure includes but is not limited to one or any combination of a point of interest, geographical location information, or path trajectory information. An interactive server system in the embodiments of the present disclosure may also be referred to as a background server, a component server, a social networking service server, or the like. An interactive client in the embodiments of the present invention may include an application client having a social networking function. The interactive client may run on the interactive terminal 101. The interactive terminal 101 can be but is not limited to a mobile phone (including a smartphone), a mobile computer, a tablet computer, a personal digital assistant (PDA), a media player, a smart television, a smart watch, smart glasses, and a smart band. An in-vehicle terminal in the embodiments of the present disclosure can be a terminal or device disposed in a vehicle such as an automobile and controlling an integrated function such as automobile multimedia entertainment, air-conditioning, or navigation.

Figure 2:
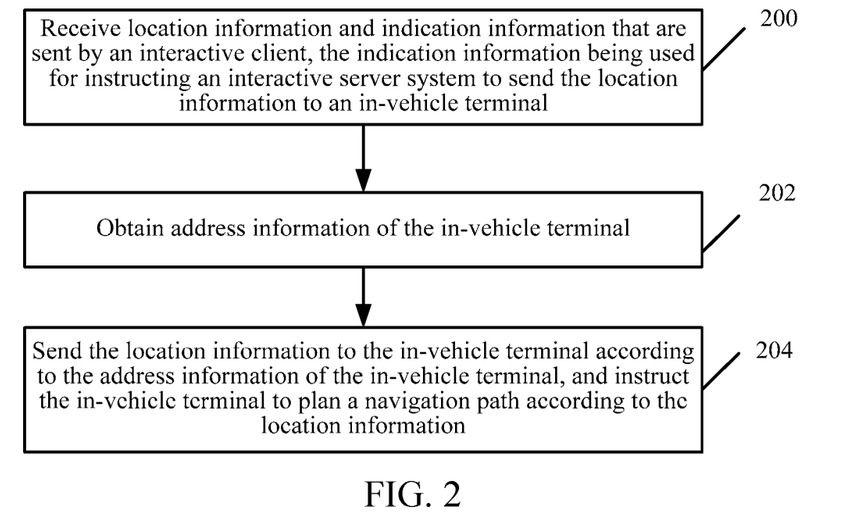
FIG. 2 shows a flowchart of a vehicle navigation method according to an embodiment of the present disclosure.

FIG. 2 is a flowchart of a vehicle navigation method according to an embodiment of the present disclosure. The method can be performed at the interactive server system 102. The method may include the following steps:

Step 200: Receive location information and indication information that are sent by an interactive client 106. The indication information can be used for instructing the interactive server system 102 to send the location information to an in-vehicle terminal 103 or 104. The indication information can indicate address information of an in-vehicle terminal 103 or 104, such that the interactive server system 102 can obtain or derive the address information based on the indication information.

For example, a user may install and run the interactive client 106 on the interactive terminal 101, to interact with another interactive client by using a social networking service, an interactive system, or platform provided by the interactive server system 102. When the user needs to send location information to the in-vehicle terminal 103 or 104 by using the interactive client 106 of the user, the interactive server system 102 receives the location information and indication information that are sent by the interactive client 106. The indication information in this embodiment of the present disclosure is used for instructing the interactive server system 102 to send the location information to the in-vehicle terminal 103 or 104.

It may be understood that the interactive server system 102 and the interactive client 106 in this embodiment of the present disclosure may agree on a communications protocol in advance. For example, the location information and the indication information may be integrated in a same data packet for sending, or may be sent by using different data packets. This is not limited in this embodiment of the present disclosure as long as the interactive server system can obtain the location information and the indication information by parsing the received data packet. In addition, content format of the location information and indication information is also agreed on in advance by the interactive server system 102 and the interactive client 106. Therefore, the interactive server system 102 can successfully parse the content of the location information and the indication information, to know that the received location information needs to be sent to the in-vehicle terminal 103 or 104.

Step 202: Obtain address information of the in-vehicle terminal based on the indication information.

Specifically, the interactive server system 102 may prestore the address information of the in-vehicle terminal 103 or 104. For example, the user can register in advance basic information (including the address information) of the in-vehicle terminal 103 or 104 with the interactive server system 102. Alternatively, the indication information sent by the interactive client 106 may include the address information of the in-vehicle terminal 103 or 104. In this case, the interactive server system 102 may not prestore the address information of the in-vehicle terminal.

Step 204: Send the location information to the in-vehicle terminal 103 or 104 according to the address information obtained at step 202, and instruct the respective in-vehicle terminal to plan a navigation path according to the location information.

Specifically, the in-vehicle terminal 103 or 104 in this embodiment of the present disclosure has a function of connecting to the network 105b or 105c (such as the Internet). The interactive server system 102 may establish a communication connection to the in-vehicle terminal 103 or 104 according to the address information (e.g., network address information, such as an IP address) of the in-vehicle terminal 103 or 104, and send the location information to the in-vehicle terminal 103 or 104. It may be understood that, a content format of the location information is also agreed on in advance by the interactive server system 102 and the in-vehicle terminal 103 or 104. Therefore, the in-vehicle terminal 103 or 104 can successfully parse the location information, and invoke a map navigation application of the in-vehicle terminal 103 or 104, to plan navigation path information by using the location information. For example, the location information includes a point of interest. In this case, after parsing out the point of interest, the in-vehicle terminal can plan a path from a current geographical location to the point of interest.

Figure 3:
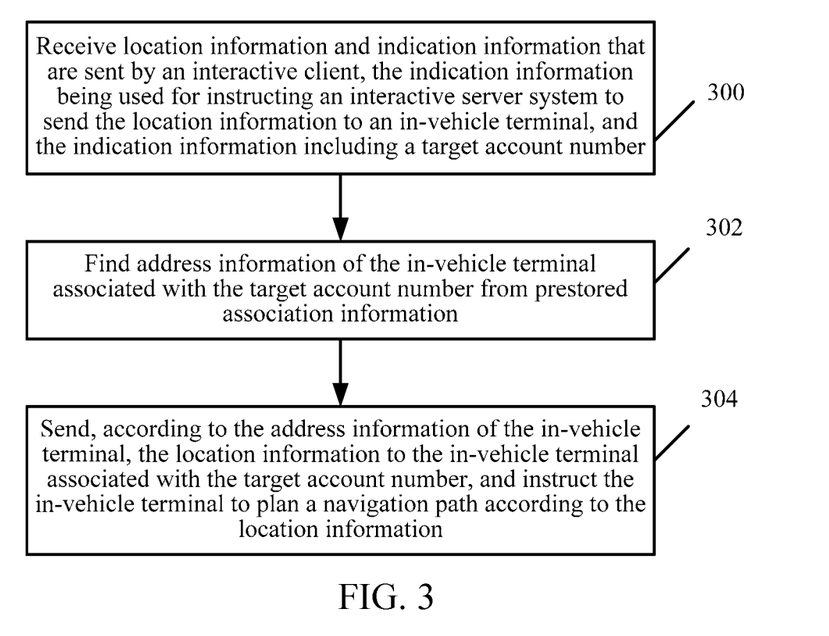
FIG. 3 shows a flowchart of a vehicle navigation method according to an embodiment of the present disclosure.

FIG. 3 shows a flowchart of a vehicle navigation method according to an embodiment of the present disclosure. The method can be performed at the interactive server system 102. For example, the interactive server system 102 prestores at least one target account number, address information of at least one in-vehicle terminal, and association information between the at least one target account number and the address information of the at least one in-vehicle terminal. The method may include the following steps:

Step 300: Receive location information and indication information that are sent by the interactive client 106, the indication information being used for instructing the interactive server system 102 to send the location information to an in-vehicle terminal (e.g., in-vehicle terminal 103 or 104), and the indication information including the target account number.

For example, the interactive server system 102 may store association information between a target account number and address information of the in-vehicle terminal 103. For example, the in-vehicle terminal 103 and the target account number are bound to each other, and they are in a one-to-one correspondence with each other. A user may log in to the interactive client 106 by using a login account number, select the target account number to which location information needs to be sent, and enter a transmit instruction. Then the interactive server system 102 receives the location information and indication information. It may be understood that the interactive server system 102 and the interactive client 106 may agree on the target account number in the indication information in advance, to instruct the interactive server system to send the location information to the in-vehicle terminal associated with the target account number.

Step 302: Find the address information of the in-vehicle terminal 103 associated with the target account number from the prestored association information.

Specifically, after parsing out the target account number in the indication information, the interactive server system may traverse the prestored association information between the target account number and the address information of the in-vehicle terminal 103, to find the address information of the in-vehicle terminal 103 associated with the target account number.

Step 304: Send, according to the address information of the in-vehicle terminal 103, the location information to the in-vehicle terminal 103 associated with the target account number, and instruct the in-vehicle terminal 103 to plan a navigation path according to the location information.

Step 304 is similar to step 204 in the embodiment of FIG. 2, and for brevity, details are not described herein again.

By using this embodiment of the present disclosure, a user can send, by using an account number logging into an interactive client, location information to an account number bound to an in-vehicle terminal (which may be an in-vehicle terminal of the user or an in-vehicle terminal of the user's friend), to implement navigation initiation by the respective in-vehicle terminal.

Figure 4:
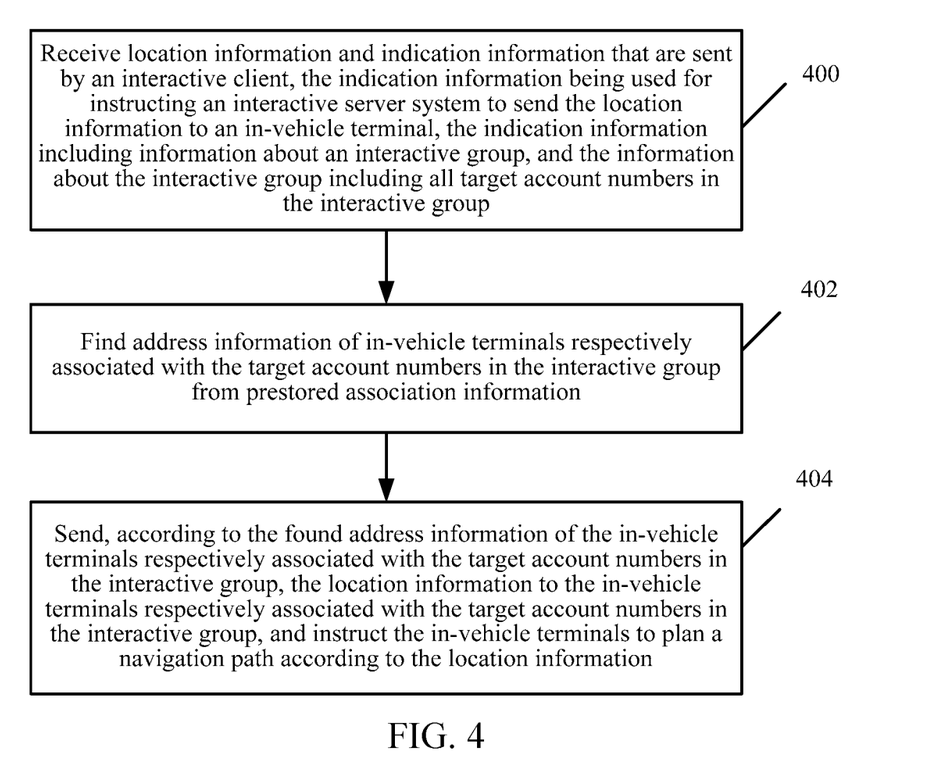
FIG. 4 shows a flowchart of a vehicle navigation method according to an embodiment of the present disclosure.

FIG. 4 shows a flowchart of a vehicle navigation method according to an embodiment of the present disclosure. The method can be performed at the interactive server system 102. The interactive server system 102 can prestore a login account number of the interactive client 106, at least one target account number, address information of at least one in-vehicle terminal, and association information between the at least one target account number and the address information of the at least one in-vehicle terminal, and the login account number and the at least one target account number form an interactive group. The method may include the following steps:

Step 400: Receive location information and indication information that are sent by the interactive client 106. The indication information can be used to instruct the interactive server system 102 to send the location information to an in-vehicle terminal. The indication information can include information about the interactive group, and the information about the interactive group can include all target account numbers in the interactive group.

Specifically, the interactive server system 102 in this embodiment of the present disclosure may store association information between a target account number and address information of an in-vehicle terminal. For example, the in-vehicle terminal and the target account number are bound to each other, and they are in a one-to-one correspondence with each other. A user may log into the interactive client 106 by using an login account number, select an interactive group to which location information needs to be sent, and enter a transmit instruction. Then the interactive server system 102 receives the location information and indication information. It may be understood that the interactive server system 102 and the interactive client 106 may agree on the information about the interactive group in the indication information in advance, to instruct the interactive server system 102 to send the location information to the in-vehicle terminals respectively associated with the target account numbers in the group.

Step 402: Find address information of in-vehicle terminals respectively associated with the target account numbers in the interactive group from the prestored association information.

Step 404: Send, according to the found address information of the in-vehicle terminals respectively associated with the target account numbers in the interactive group, the location information to the in-vehicle terminals respectively associated with the target account numbers in the interactive group, and instruct the in-vehicle terminals to plan a navigation path according to the location information.

Specifically, for sent address information of each in-vehicle terminal, for step 402 and step 404, refer to step 302 and step 304 in the embodiment of FIG. 3, and details are not described herein again. By using this embodiment of the present disclosure, a user can send location information to an in-vehicle terminal group (which may include both an in-vehicle terminal of the user and an in-vehicle terminal of the user's friend) by using a login account number, to implement navigation initiation by each in-vehicle terminal.

During implementation of the embodiments of the present disclosure, a terminal on which an interactive client is running sends location information to a server (e.g., a cloud end), and the cloud end may send the location information to an in-vehicle terminal, so that the in-vehicle terminal directly plans (or generates) a navigation path according to the location information, thereby resolving the technical problem in the related technology that a user needs to interact with an in-vehicle terminal for multiple times to initiate navigation, and improving the efficiency of navigation initiation. In addition, location information of another application client may further be integrated, so that map resources for navigation initiation are richer. In addition, the user may further enable, by means of trajectory sharing by the interactive client, the in-vehicle terminal to initiate navigation. Further, employment of an interactive group can enable multiple in-vehicle terminals to initiate navigation together. The embodiments disclosed herein greatly can facilitate navigation initiation on the in-vehicle terminals, and improve user experience in navigation initiation on the in-vehicle terminal.

Figure 5:
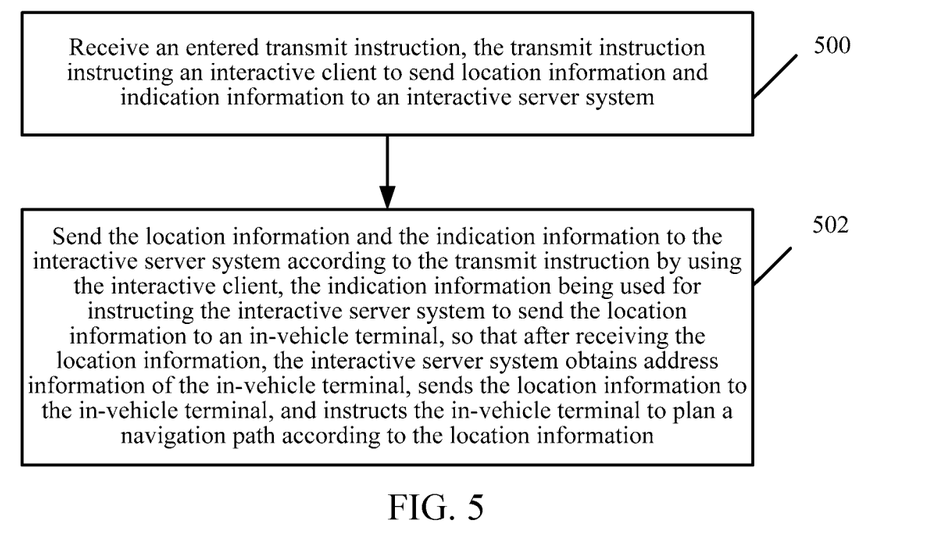
FIG. 5 shows a flowchart of a vehicle navigation method according to an embodiment of the present disclosure.

FIG. 5 shows a flowchart of a vehicle navigation method according to an embodiment of the present disclosure. The method can be performed at an interactive terminal (e.g., interactive terminal 101). The method may include the following steps:

Step 500: Receive an entered transmit instruction, the transmit instruction instructing the interactive client 106 to send location information and indication information to the interactive server system 102.

Specifically, a user may install and run the interactive client 106 on the interactive terminal 101, to interact with another interactive client by using an interactive system or platform provided by the interactive server system 102. The user enters a transmit instruction in a transmit interface when needing to send location information to an in-vehicle terminal by using the interactive client 106 of the user, and then the interactive client 106 running on the interactive terminal 101 receives the transmit instruction. The indication information includes address information of the in-vehicle terminal or a target account number associated with the in-vehicle terminal. Or, the indication information can indicate an interactive group that is associated with a group of target account numbers that is each associated with an in-vehicle terminal.

Step 502: Send the location information and the indication information to the interactive server system 102 according to the transmit instruction by using the interactive client 106, the indication information being used for instructing the interactive server system 102 to send the location information to an in-vehicle terminal(s), so that after receiving the location information, the interactive server system 102 obtains address information of the in-vehicle terminal(s), sends the location information to the in-vehicle terminal(s), and instructs the in-vehicle terminal(s) to plan a navigation path according to the location information.

Specifically, after receiving the location information, the interactive server system 102 sends the location information to the in-vehicle terminal(s) according to the address information of the in-vehicle terminal(s), to instruct the in-vehicle terminal(s) to invoke a map navigation application and to plan the navigation path according to the location information. For a specific method procedure performed on a side of the interactive server system 102, refer to the descriptions in the embodiments of FIG. 2 to FIG. 4. Details are not described herein again.

Further, in step 500, the user may start the interactive client 106 and select or generate location information on the interactive client 106, the location information being location information on the application client 106, and then instruct to send the location information to the in-vehicle terminal(s).

In addition, a second application client (not the foregoing interactive client 106) in the interactive terminal 101 may be used to receive a transmit instruction.

Specifically, in addition to running the interactive client 106, the interactive terminal may further install and run other application clients including the second application client, and those application clients may also have location information (for example, geographical location information on a client for group-buying, or restaurant location information recommended on a comment and share client). Thus, by using the second application client, a user can conveniently retrieve a destination address for initiating navigation at an in-vehicle terminal.

Further, in step 502, when the user needs to send the location information to the in-vehicle terminal by using the interactive server system 102, the second application client may invoke a transmit interface associated with the interactive client 106, to send the location information and the indication information to the interactive server system 102.

Figure 6:
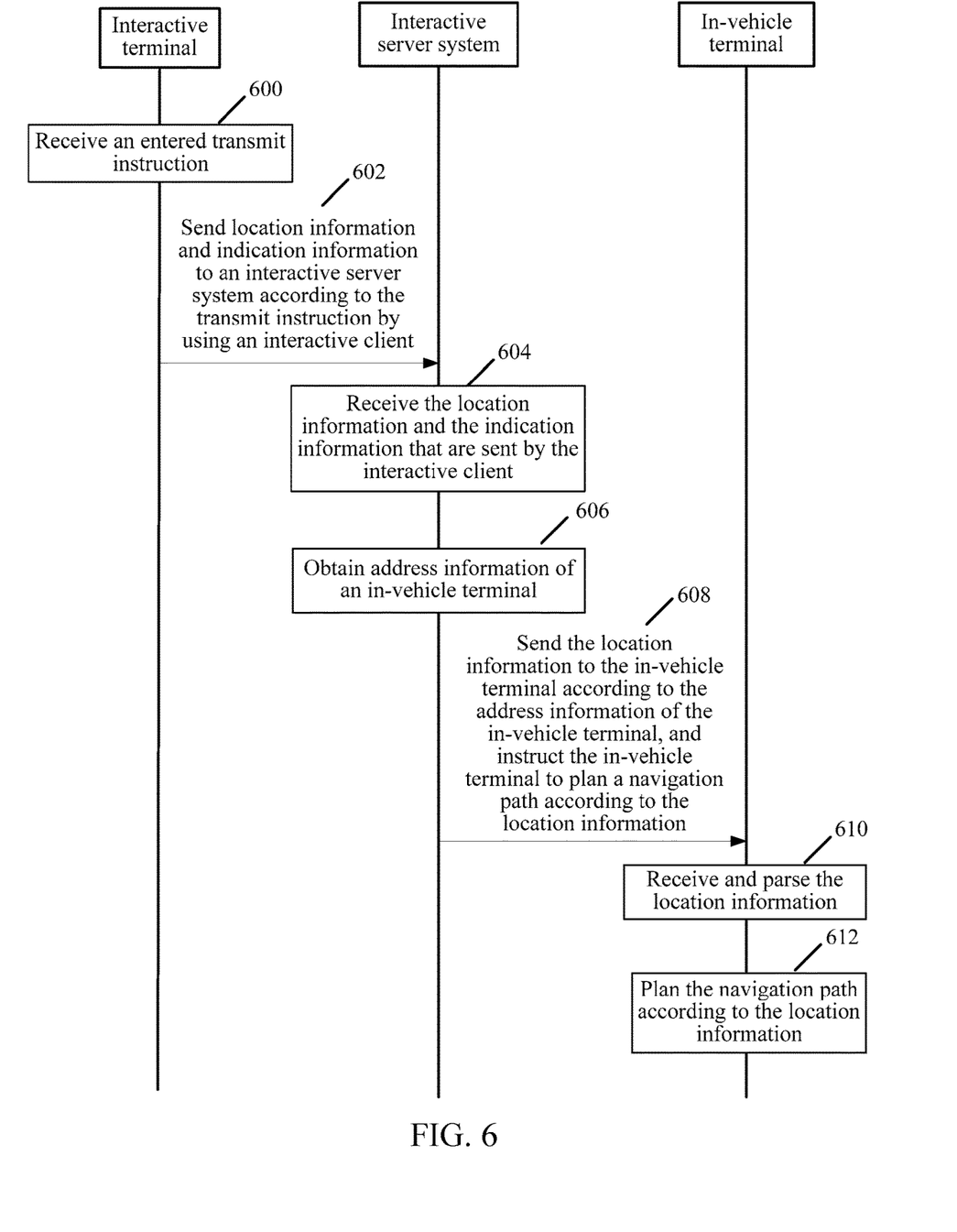
FIG. 6 shows a flowchart of a vehicle navigation method according to an embodiment of the present disclosure.

FIG. 6 shows a flowchart of a vehicle navigation method according to an embodiment of the present disclosure. The method can be performed with the navigation system 10 shown in FIG. 1 example. The method may include the following steps:

Step 600: The interactive terminal 101 receives an entered transmit instruction.

Step 602: The interactive terminal 101 sends location information and indication information to the interactive server system 102 according to the transmit instruction by using an interactive client 106.

Step 604: The interactive server system 102 receives the location information and the indication information that are sent by the interactive client 106.

Step 606: The interactive server system 102 obtains address information of the in-vehicle terminal 103 and/or 104.

It is noted that in step 606, address information of an in-vehicle terminal associated with a target account number may be found from prestored association information, or address information of in-vehicle terminals respectively associated with target account numbers in an interactive group may be found from prestored association information.

Step 608: The interactive server system 102 sends the location information to the in-vehicle terminal 103 and/or 104 according to the address information of the in-vehicle terminal(s), and instructs the in-vehicle terminal(s) to plan a navigation path according to the location information.

Step 610: The in-vehicle terminal 103 and/or 104 receives and parses the location information.

Step 612: The in-vehicle terminal 103 and/or 104 plans the navigation path according to the location information.

In this embodiment of the present disclosure, a terminal on which an interactive client is running sends location information to a server (e.g., a cloud end), and the cloud end may send the location information to an in-vehicle terminal, so that the in-vehicle terminal directly plans (or generates) a navigation path according to the location information, thereby resolving the technical problem in the related technology that a user needs to interact with an in-vehicle terminal for multiple times to initiate navigation, and improving the efficiency of navigation initiation. Further, location information of other application clients may further be integrated, so that location information resources for navigation initiation are richer. In addition, the user may further enable, by means of trajectory sharing by the interactive client, the in-vehicle terminal to initiate navigation. Moreover, an interactive group can be used to enable multiple in-vehicle terminals to initiate navigation together. Therefore, the embodiments disclosed herein can facilitate navigation initiation on the in-vehicle terminals, and improve user experience.

Figure 7:
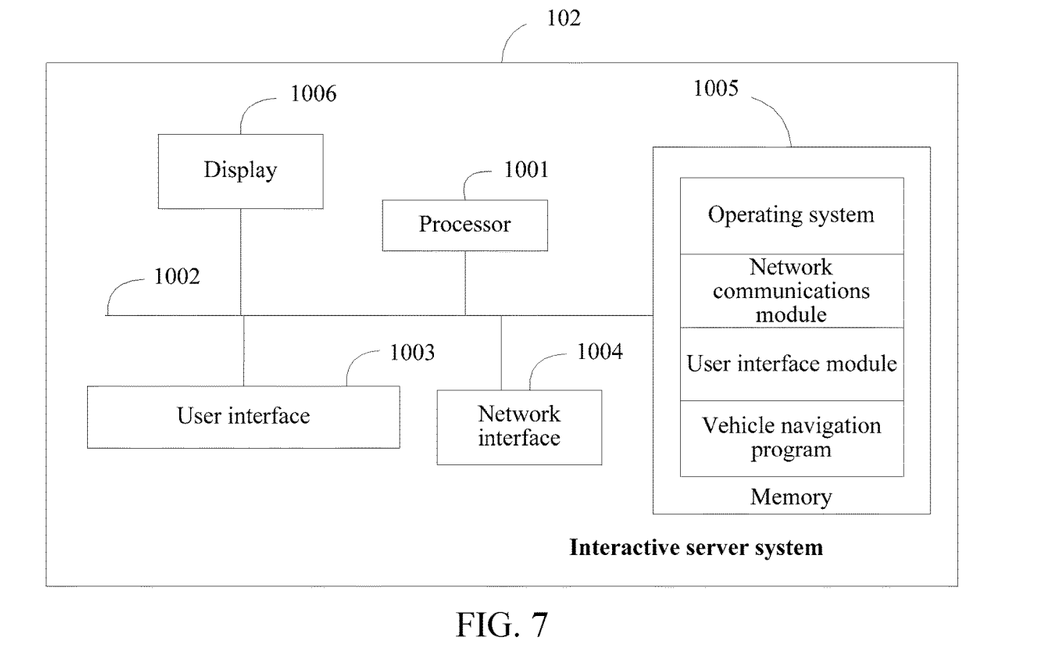
FIG. 7 shows a schematic structural diagram of an interactive server system according to an embodiment of the present disclosure.

In addition, referring to FIG. 7, FIG. 7 shows a schematic structural diagram of an interactive server system 102 according to an embodiment of the present disclosure. As shown in FIG. 7, the interactive server system 102 may include at least one processor 1001 (such as a CPU), at least one network interface 1004, a user interface 1003, a memory 1005, at least one bus 1002, and a display 1006. The bus 1002 is configured to implement connection and communication between the components. The user interface 1003 may include a keyboard, a mouse, a touchscreen, or the like. The network interface 1004 may optionally include a standard wired interface or wireless interface (for example, a Wi-Fi interface), and is configured to communicate with and connect to an interactive terminal and an in-vehicle terminal. The memory 1005 may be a high-speed RAM memory, or may be a non-volatile memory, for example, at least one magnetic disk memory. The memory 1005 includes a flash in this embodiment of the present disclosure. Optionally, the memory 1005 may be at least one storage system located remotely from the foregoing processor 1001. As shown in FIG. 7, the memory 1005, which is used as a computer storage medium, may include an operating system, a network communications module, a user interface module, and a vehicle navigation program for performing a vehicle navigation method described herein.

For example, the processor 1001 may be configured to: invoke the vehicle navigation program stored in the memory 1005, and perform the following operations: receiving, by using the network interface 1004, location information and indication information that are sent by an interactive client, the indication information being used for instructing the interactive server system to send the location information to the in-vehicle terminal; obtaining address information of the in-vehicle terminal; and sending, by using the network interface 1004, the location information to the in-vehicle terminal according to the address information of the in-vehicle terminal, and instructing the in-vehicle terminal to plan a navigation path according to the location information.

For example, the indication information includes the address information of the in-vehicle terminal.

For example, the instructing the in-vehicle terminal to plan a navigation path according to the location information includes: instructing the in-vehicle terminal to invoke a map navigation application and to plan the navigation path according to the location information.

In one example, the memory 1005 of the interactive server system 102 stores at least one target account number, address information of at least one in-vehicle terminal, and association information between the at least one target account number and the address information of the at least one in-vehicle terminal, and the indication information includes the target account number. The obtaining address information of the in-vehicle terminal includes: finding the address information of the in-vehicle terminal associated with the target account number from the prestored association information. The sending the location information to the in-vehicle terminal according to the address information of the in-vehicle terminal includes: sending the location information to the in-vehicle terminal associated with the target account number.

In one example, the memory 1005 of the interactive server system 102 stores a login account number of an interactive client, at least one target account number, address information of at least one in-vehicle terminal, and association information between the at least one target account number and the address information of the at least one in-vehicle terminal, the login account number and the at least one target account number form an interactive group, the indication information includes information about the interactive group, and the information about the interactive group includes target account numbers in the interactive group. The obtaining address information of the in-vehicle terminal includes: finding address information of in-vehicle terminals respectively associated with the target account numbers in the interactive group from the prestored association information. The sending the location information to the in-vehicle terminal according to the address information of the in-vehicle terminal includes: sending, according to the found address information of the in-vehicle terminals respectively associated with all the target account numbers in the interactive group, the location information to the in-vehicle terminals respectively associated with all the target account numbers in the interactive group.

It is noted that functions of functional modules of the interactive server system 102 in this embodiment of the present disclosure may be specifically implemented according to the methods in the foregoing method embodiments. For a specific implementation process thereof, refer to related descriptions of the foregoing method embodiments, and details are not described here again.

Figure 8:
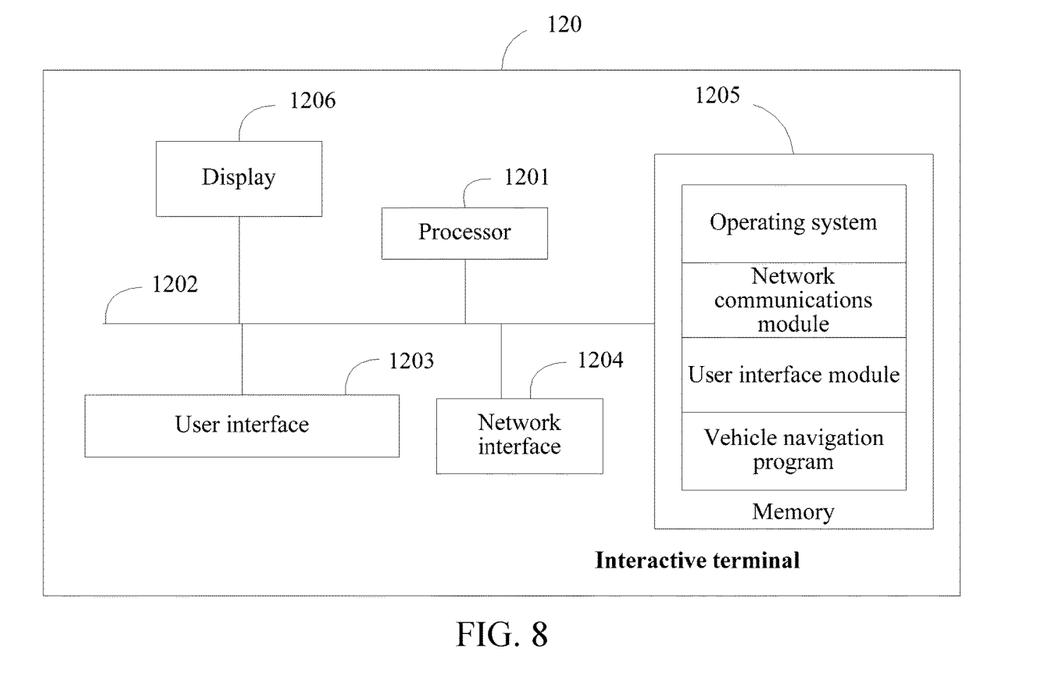
FIG. 8 shows a schematic structural diagram of an interactive terminal according to an embodiment of the present disclosure.

FIG. 8 shows a schematic structural diagram of an interactive terminal 120 according to an embodiment of the present disclosure. The terminal 120 can be an example for implementing the interactive terminals 101. As shown in FIG. 8, the interactive terminal 120 may include at least one processor 1201 (such as a CPU), at least one network interface 1204, a user interface 1203, a memory 1205, at least one bus 1202, and a display 1206. The bus 1202 is configured to implement connection and communication between the components. The user interface 1203 may include a keyboard, a mouse, a touchscreen, or the like. The network interface 1204 may optionally include a standard wired interface or wireless interface (for example, a Wi-Fi interface), and is configured to communicate with and connect to an interactive server system and an in-vehicle terminal. The memory 1205 may be a high-speed RAM memory, or may be a non-volatile memory, for example, at least one magnetic disk memory. The memory 1205 includes a flash in this embodiment of the present disclosure. Optionally, the memory 1205 may be at least one storage system located remotely from the foregoing processor 1201. As shown in FIG. 8, the memory 1205, which is used as a computer storage medium, may include an operating system, a network communications module, a user interface module, and a vehicle navigation program for performing a vehicle navigation method described herein.

In one example, the processor 1201 may be configured to: invoke the vehicle navigation program stored in the memory 1205, and perform the following operations: receiving an entered transmit instruction by using the user interface 1203, the transmit instruction instructing an interactive client to send location information and indication information to the interactive server system; and sending, by using the network interface 1204, the location information and the indication information to the interactive server system according to the transmit instruction by using the interactive client, the indication information being used for instructing the interactive server system to send the location information to an in-vehicle terminal, so that after receiving the location information, the interactive server system obtains address information of the in-vehicle terminal, sends the location information to the in-vehicle terminal, and instructs the in-vehicle terminal to plan a navigation path according to the location information.

In one example, the indication information includes the address information of the in-vehicle terminal, a target account number associated with the in-vehicle terminal, or information indicating an interactive group.

In one example, the location information is location information on an application client. The receiving an entered transmit instruction by using the user interface 1203 includes: receiving, by using the user interface 1203, the entered transmit instruction by using the application client.

In one example, the sending, by using the network interface 1204, the location information and the indication information to the interactive server system according to the transmit instruction by using the interactive client includes: sending, by using the network interface 1204 and according to the transmit instruction received by the application client, the location information and the indication information to the interactive server system by invoking a transmit interface associated with the interactive client.

It is noted that the interactive terminal 120 in this embodiment of the present disclosure includes but is not limited to user equipment such as a personal computer, a mobile intelligent terminal (such as a mobile phone), a tablet computer, a PDA, a media player, a smart television, a smart swatch, smart glasses, and a smart band. Functions of the functional modules of the interactive terminal 120 may be specifically implemented according to the methods in the foregoing method embodiments. For a specific implementation process thereof, refer to related descriptions in the foregoing method embodiments. Details are not described herein again.

Figure 9:
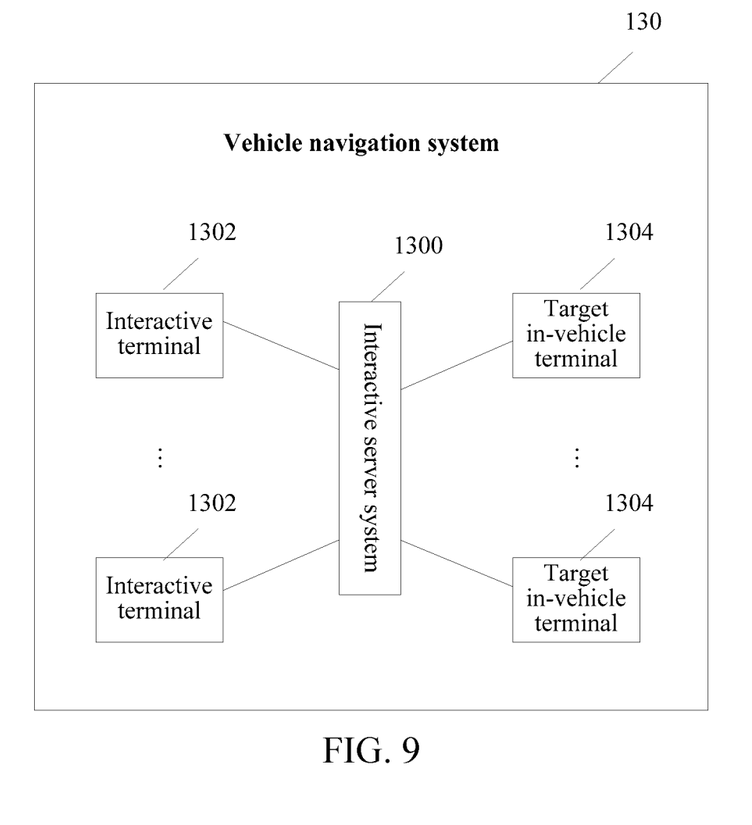
FIG. 9 shows a schematic structural diagram of a vehicle navigation system according to an embodiment of the present disclosure.

FIG. 9 shows a schematic structural diagram of a vehicle navigation system 130 according to an embodiment of the present disclosure. The vehicle navigation system 130 may include an interactive server system 1300, an interactive terminal 1302, and an in-vehicle terminal 1304. There may be multiple interactive terminals 1302 and multiple in-vehicle terminals 130.

The interactive server system 1300 may be the interactive server system in the embodiment of FIG. 7. Details are not described herein again.

The interactive terminal 1302 may be the interactive terminal in the embodiment of FIG. 8. Details are not described herein again.

In the embodiments of the present disclosure, a terminal on which an interactive client is running sends location information to a server (e.g., a cloud end), and the cloud end may send the location information to an in-vehicle terminal, so that the in-vehicle terminal directly plans (or generates) a navigation path according to the location information, thereby resolving the technical problem in related technology that a user needs to interact with an in-vehicle terminal for multiple times to initiate navigation, and improving the efficiency of navigation initiation. Further, location information of another application client may further be integrated, so that location information sources for navigation initiation are richer. In addition, the user may further enable, by means of trajectory sharing by the interactive client, the in-vehicle terminal to initiate navigation. Moreover, by using an interactive group, multiple in-vehicle terminals can be enabled to initiate navigation together. Therefore, the embodiments disclosed herein can greatly facilitate navigation initiation on the in-vehicle terminals, and improve user experience.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below

What is claimed is:

1. A method of an interactive server system for providing location information to an in-vehicle terminal of a vehicle, the method comprising:

receiving, by processing circuitry of the interactive server system, an instruction that includes the location information and indication information, the instruction being generated from a transmit interface by a social networking client application running on a client terminal, the location information including a destination address indicating a driving destination designated by user selection in the social networking client application running on the client terminal;

parsing, by the processing circuitry of the interactive server system, the instruction to obtain the location information and the indication information from the instruction;

obtaining, by the processing circuitry of the interactive server system, network address information of the in-vehicle terminal based on the indication information parsed from the instruction;

sending, by the processing circuitry of the interactive server system, the location information parsed from the instruction to the in-vehicle terminal according to the network address information of the in-vehicle terminal;

instructing, by the processing circuitry of the interactive server system, the in-vehicle terminal to invoke a map navigation application to generate a navigation path to the driving destination designated by the user selection in the social networking client application; and receiving, by the processing circuitry of the interactive server system, a second instruction generated from the transmit interface of the social networking client application running on the client terminal, the second instruction being generated based on second location information and second indication information received by the social networking client application from a second application executed on the client terminal, and the second instruction being configured to be transmitted in response to the second application invoking the transmit interface of the social networking application.

2. The method according to claim 1, wherein the indication information comprises the network address information of the in-vehicle terminal.

3. The method according to claim 1, wherein
the indication information includes a target account number, and
the obtaining the network address information of the in-vehicle terminal based on the indication information parsed from the instruction includes obtaining the network address information of the in-vehicle terminal based on the indication information parsed from the instruction and based on association information between the target account number and the network address information of the in-vehicle terminal stored in a memory of the interactive server system.

4. The method according to claim 1, wherein
the indication information indicates an interactive group associated with one or more target account numbers; and
the interactive server system stores association information between the one or more target account numbers and network address information of one or more in-vehicle terminals, the one or more in-vehicle terminals including the in-vehicle terminal.

5. The method according to claim 4, further comprising:
obtaining the network address information of the one or more in-vehicle terminals associated with the one or more target account numbers in the interactive group based on the indication information and based on the association information stored in a memory of the interactive server system; and
sending the location information to the one or more in-vehicle terminals corresponding to the network address information associated with the one or more target account numbers that are associated with the interactive group.

6. The method according to claim 1, wherein the location information comprises at least one of a point of interest, geographical location information, or path trajectory information.

7. The method of claim 1, wherein the instructing comprises instructing the in-vehicle terminal to invoke the map navigation application to generate the navigation path, which is a path to the driving destination designated by the user selection in the social networking client application.

8. A non-transitory computer-readable medium storing instructions, which when executed by a computer of an interactive server system cause the computer to perform a method of providing location information to an in-vehicle terminal of a vehicle, the method comprising:

receiving an instruction that includes the location information and indication information, the instruction being generated from a transmit interface by a social networking client application running on a client terminal, the location information including a destination address indicating a driving destination designated by user selection in the social networking client application running on the client terminal;

parsing the instruction to obtain the location information and the indication information from the instruction;

obtaining network address information of the in-vehicle terminal based on the indication information parsed from the instruction;

sending the location information parsed from the instruction to the in-vehicle terminal according to the network address information of the in-vehicle terminal;

instructing the in-vehicle terminal to invoke a map navigation application to generate a navigation path to the driving destination designated by the user selection in the social networking client application; and receiving a second instruction generated from the transmit interface of the social networking client application running on the client terminal, the second instruction being generated based on second location information and second indication information received by the social networking client application from a second application executed on the client terminal, and the second instruction being configured to be transmitted in response to the second application invoking the transmit interface of the social networking application.

9. The non-transitory computer-readable medium according to claim 8, wherein the indication information comprises the network address information of the in-vehicle terminal.

10. The non-transitory computer-readable medium according to claim 8, wherein the indication information comprises a target account number associated with the network address information of the in-vehicle terminal.

11. The non-transitory computer-readable medium according to claim 8, wherein
the indication information indicates an interactive group that is associated with one or more target account numbers, the one or more target account numbers being associated with network address information of one or more in-vehicle terminals, the one or more in-vehicle terminals including the in-vehicle terminal, and
wherein the method further comprises:
obtaining the network address information of the one or more in-vehicle terminals based on the indication information,
sending the location information to the one or more in-vehicle terminals according to the network address information, and
instructing each of the one or more in-vehicle terminals corresponding to the obtained network address information to generate the navigation path according to the location information.

12. The non-transitory computer-readable medium according to claim 8,
wherein the second indication information comprises the network address information of the in-vehicle terminal.

13. The non-transitory computer-readable medium according to claim 8, wherein the location information comprises at least one of a point of interest, geographical location information, or path trajectory information.

14. An interactive server system, comprising:
processing circuitry configured to:
- receive an instruction that includes location information and indication information, the instruction being generated from a transmit interface by a social networking client application running on a client terminal, the location information including a destination address indicating a driving destination designated by user selection in the social networking client application running on the client terminal;
- parse the instruction to obtain the location information and the indication information from the instruction;
- obtain network address information of an in-vehicle terminal based on the indication information parsed from the instruction;
- send the location information parsed from the instruction to the in-vehicle terminal according to the network address information of the in-vehicle terminal;
- instruct the in-vehicle terminal to invoke a map navigation application to generate a navigation path to the driving destination designated by the user selection in the social networking client application; and
- receive a second instruction generated from the transmit interface of the social networking client application running on the client terminal, the second instruction being generated based on second location information and second indication information received by the social networking client application from a second application executed on the client terminal, and the second instruction being configured to be transmitted in response to the second application invoking the transmit interface of the social networking application.

15. The interactive server system according to claim 14, wherein the indication information comprises the network address information of the in-vehicle terminal.

16. The interactive server system according to claim 14, wherein
- the indication information includes a target account number, and
- the processing circuitry is configured to obtain the network address information of the in- vehicle terminal based on the indication information parsed from the instruction and based on association information between the target account number and the network address information of the in-vehicle terminal stored in a memory of the interactive server system.

17. The interactive server system according to claim 14, further comprising:
- a memory configured to store association information between one or more target account numbers and network address information of one or more in-vehicle terminals, the one or more in-vehicle terminals including the in-vehicle terminal, wherein
- the indication information indicates an interactive group associated with the one or more target account numbers.

18. The interactive server system according to claim 17, wherein the processing circuitry is further configured to:
- obtain the network address information of the one or more in-vehicle terminals associated with the one or more target account numbers in the interactive group based on the indication information and based on the association information stored in the memory, and
- send the location information to the one or more in-vehicle terminals corresponding to the network address information associated with the one or more target account numbers that are associated with the interactive group.

* * * * *